US00RE34891E

United States Patent [19]

Kunreuther

[11] E Patent Number: Re. 34,891

[45] Reissued Date of Patent: Apr. 4, 1995

[54] ASSEMBLY OF ATTACHMENTS AND DEVICE FOR ATTACHING SAME

[76] Inventor: Steven J. Kunreuther, 285 Central Park West, New York, N.Y. 10024

[21] Appl. No.: 218,181

[22] Filed: Mar. 28, 1994

Related U.S. Patent Documents

Reissue of:

[64] Patent No.: 5,038,931
Issued: Aug. 13, 1991
Appl. No.: 575,855
Filed: Aug. 31, 1990

U.S. Applications:

[63] Continuation-in-part of Ser. No. 347,419, May 4, 1989, abandoned.

[51] Int. Cl.[6] ..... A44B 9/00; B65D 85/24; G09F 3/12

[52] U.S. Cl. ..... 206/346; 24/711.1; 40/662; 206/820

[58] Field of Search ..... 40/662, 664; 24/711.1; 206/338–348, 380, 820

[56] References Cited

U.S. PATENT DOCUMENTS 3,103,666 9/1963 Bone .
3,733,657 5/1973 Lankton .
3,875,648 4/1975 Bone .
3,893,612 7/1975 Bone .
3,948,128 4/1976 Russell .
4,039,078 8/1977 Bone .
4,111,347 9/1978 Bone .
4,121,487 10/1978 Bone .
4,276,255 6/1981 Russell .
4,408,979 10/1983 Russell .
4,416,407 11/1983 Bone .
4,417,656 11/1983 Kato ..... 206/346
4,456,123 6/1984 Russell .
4,533,076 8/1985 Bourque .
4,534,464 8/1985 Lankton .
4,592,500 6/1986 Kato .
4,682,721 7/1987 Duchin .

*Primary Examiner*—Jimmy G. Foster
*Attorney, Agent, or Firm*—James & Franklin

[57] ABSTRACT

The assembly includes first and second parallel connecting bars between which individual attachments are situated in parallel, spaced relation. Each of the attachments includes first and second T-bar ends with a flexible filament extending therebetween. The attaching device includes a housing with a recess having a first and second sections adapted to receive the first and second connecting bars, respectively. First and second hollow needles extend from the housing. The T-bar ends are pushed through needles by simultaneously actuatable ejector rods after each is severed from the associated connecting bar. The assembly of the attachments is advanced through the housing to align the T-bars with the needles by simultaneously actuated indexing gears. The gears cooperate with the elements which join the T-bar ends and the connecting bars.

7 Claims, 7 Drawing Sheets

FIG. 6
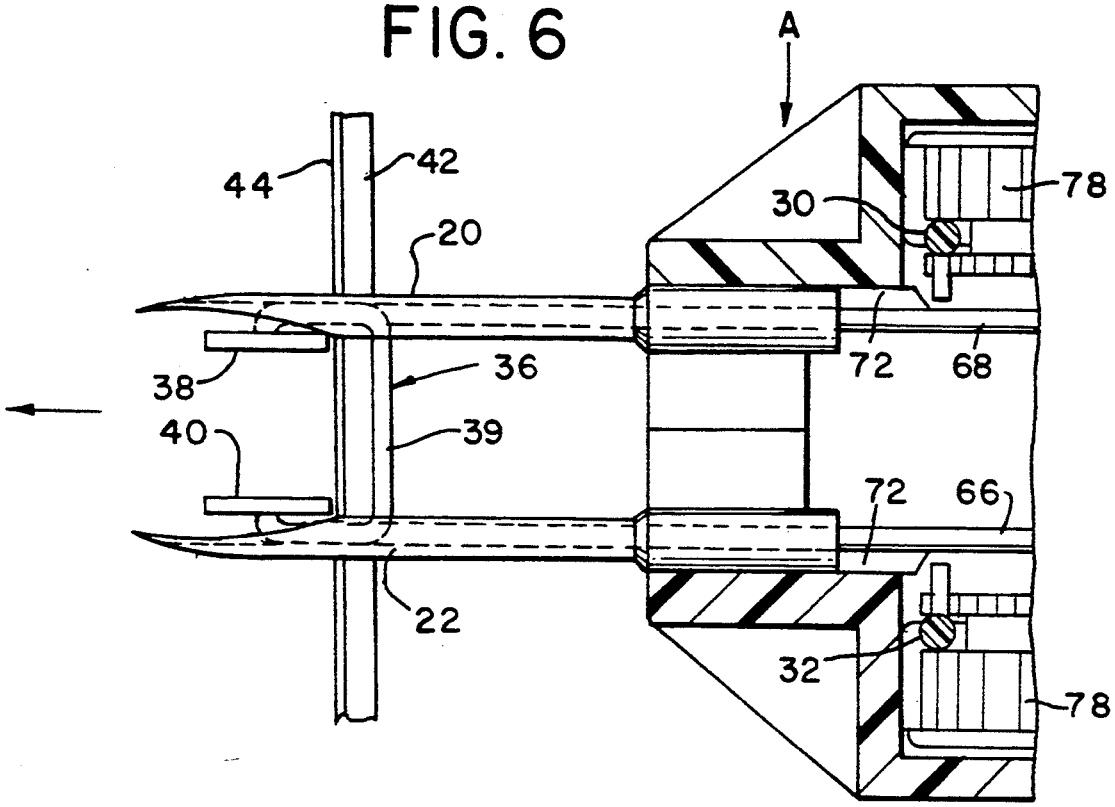
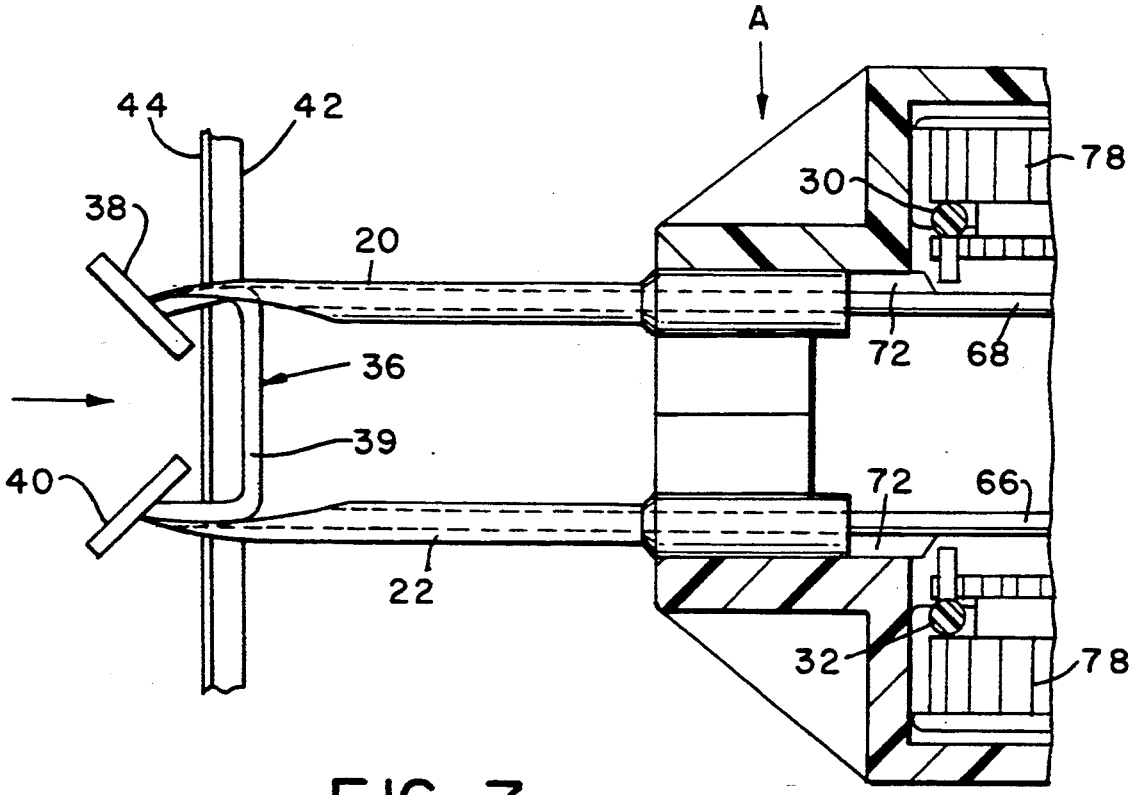
FIG. 7

ASSEMBLY OF ATTACHMENTS AND DEVICE FOR ATTACHING SAME

Matter enclosed in heavy brackets [ ] appears in the original patent but forms no part of this reissue specification; matter printed in italics indicates the additions made by reissue.

This application is a continuation-in-part of application Ser. No. 347,419, filed May 4, 1989, now abandoned.

The present invention relates to plastic attachments and to a device for attaching same and more particularly to a uniquely configured assembly of attachments which includes spaced, parallel connecting bars between which attachments having T-bar ends are situated in parallel, spaced relation and for a specially design device for attaching same.

Before modern tag attaching systems were commercialized, tags and the like were attached to garments and other soft goods by strings or straight pins. However, because of the vast number of items tagged by manufacturers and retail merchandisers and because of the relatively large amount of labor which is required to attach a tag by a string or a pin, new tagging systems were developed which increased the speed of the tagging operation and made it more efficient by decreasing the time and labor required.

The first tagging system was commercialized in the 1960's when Dennison Manufacturing Company of Framingham, Mass. began selling an assembly or clip of plastic attachments and an attacher therefore, both of which are disclosed in U.S. Pat. No. 3,103,666 of Sep. 16, 1963 to Arnold Bone entitled "Attaching Apparatus". Those attachments included a T-bar end and and enlarged paddled end connected by a flexible filament which is stretched to increase its strength. The attachments are injection moulded in clips or assemblies of 20 to 50 attachments each. The attachments are held together by means of a single connecting bar. The T-bar ends of the attachments are situated in spaced, parallel relation along the connecting bar.

The attaching device employs a hollow needle designed to penetrate the object to be tagged and the tag. After the needle was properly positioned, a single attachment was severed from the assembly and the T-bar end thereof is pushed through the channel in the needle such that the T-bar end of the attachment is situated on one side of the garment and the paddle end of the fastener on the other.

The attachments of the type described in the Bone patent became widely used in the industry. They were employed for attaching all kinds of tags and labels to articles to be sold at retail, where the attachments proved particularly effective in preventing unscrupulous shoppers from switching tags, that is, removing a tag from a low priced article and attaching it to a higher priced article. They are used as well for securing groups of articles together, such as shoes in a pair or matching tops and bottoms. The attachments were also useful for many other purposes.

The attachments could be applied at an extremely rapid rate, even by relatively unskilled personnel, thus greatly reducing the cost of the tagging operation. Over the years, other companies have distributed similar types of attachments and attaching devices. This type of system has virtually surplanted all other attaching methods.

As the attachments because widely used, it was noticed that the ones with longer filaments especially had a tendency to become tangled with other attachments in the assembly and with the attachments in adjacent assemblies particularly during shipping and handling. In order to overcome this problem, a structure was devised by which the attachments are connected together at their enlarged paddle ends, as well as at their T-bar ends. In the commercial embodiment of the so called "connected paddle" type, the enlarged paddle ends are connected together directly, instead of indirectly through the use of a connecting bar. The "connected paddle" attachment is disclosed in U.S. Pat. No. 3,733,657 entitled "Assembly of Attachments and Methods for Manipulating the Same" issued to Gordon B. Lankton on May 22, 1973. It quickly became an industry standard.

The Lankton patent also discloses an embodiment, as far as I know never commercialized, which utilizes a connecting bar on the paddle end as well as on the T-bar end. However, unlike the T-bar ends, the enlarged paddle ends are connected directly without spacing elements to the connecting bar.

In the 1970's, a new form of attachment and device for attaching same came into being. Instead of forming the attachments in clips of twenty or fifty parallel spaced attachments, strips of continuously connected coplanar attachments are formed by elongated plastic side members with cross coupling links. In this case, the attachments were situated end to end in a single plane. The ends were connected directly together, eliminating the connecting bars altogether.

These coplanar attachments are disclosed in U.S. Pat. No. 4,121,487 to Arnold Bone entitled "Continuously Connected Fastener Attachment Stock" issued Oct. 24, 1978. That patent also discloses an attacher for the coplanar attachments. The commercial attacher sold by Dennison which uses this type of attachment is called the System 1000. The attachments in the System 1000 are supplied in a roll.

Also with the 1970's another form of coplanar attachment was invented. The attachments consisted of two T-bar ends and where connected directly together at the tip of the T-bars to form continuous stock which could be rolled. These attachments were designed to be used in a manner similar to that of staples or tacks because both T-bar ends are situated on one side of the object to be tagged with the filament on the other side. In order to accomplish this the attachments were structured to be dispensed through devices which include two needles such that the T-bars are fed through the needles simultaneously. Here again, no connecting bars are employed. U.S. Pat. No. 3,875,648 entitled "Fastener Attachment Apparatus and Method" issued Apr. 8, 1975 to Arnold R. Bone discloses such attachments and apparatus for attaching same.

The present invention, in general, relates to a differently configured attachment assembly designed for uses similar to that of the attachments disclosed in the Bone patent referred to in the previous paragraph and a uniquely designed device for attaching the attachments. The assembly of attachments of the present invention includes first and second connecting bars between which attachments are situated in spaced, parallel relation. Each attachment has a first and a second T-bar end. The ends are joined by a flexible filament.

Unlike the original Bone fasteners, applicant's attachments include two connecting bars. Each of the T-bar ends is connected to a different one of the connecting bars. Unlike the Lankin converted paddle fasteners, the attachments of two present inventions have T-bars at both ends which are joined to and spaced from two connecting bars. Unlike the continuous stock fasteners, the attachments of the present invention include connecting bars and are situated in parallel, spaced relation instead of contiguous, coplanar relation.

The attaching device of the present invention includes a recess which has spaced portions adapted to accept the connecting bars, respectively. This structure permits the attachments to move through the attaching device with greater precision and reduced chance of jamming. The attaching device includes simultaneously movable ejector rods, both of which are connected to a single actuator. In addition, dual indexing means cooperate with the assemblies, proximate each side thereof, such that the indexing operation is smooth and reliable.

The system of the present invention is particularly useful in applying attachments for tacking or stapling labels or headers to articles or packaging. However, those skilled in the art will appreciate that there are a multitude of other uses to which the present invention is suited.

It is, therefore, a prime object of the present invention to provide an assembly of attachments which have T-bars at either end and are situated in spaced, parallel relation between two connecting bars.

It is another object of the present invention to provide a device for dispensing attachments situated in parallel, spaced relation between the connecting bars.

It is another object of the present invention to provide a device for dispensing attachments which includes dual injector rods which are simultaneously actuated.

It is another object of the present invention to provide a device for dispensing attachments wherein dual indexing means are provided to cooperate with opposite ends of the attachments.

In accordance with one aspect of the present invention, an assembly of attachments is provided including first and second substantially parallel connecting bars between which individual attachments are situated in substantially parallel, spaced relation. Each of the attachments includes first and second T-bar ends with a substantially flexible filament extending therebetween.

Means are provided for joining the first T-bar end in spaced relation with the first connecting bar. Similarly, means are provided for joining the second T-bar end in spaced relation with the second connecting bar.

The connecting bars are situated in a plane substantially perpendicular to the planes in which the attachments are situated. Preferably, the connecting bars and the attachments are integral and composed of molded plastic.

In accordance with another aspect of the present invention, a device is provided for dispensing attachments of the type having first and second T-bar ends with a flexible filament therebetween, the attachments being supplied in an assembly between first and second spaced connecting bars joined to the first and second T-bar ends, respectively. The device includes a housing. A recess in the housing has first and second spaced sections adapted to receive the first and second connecting bars, respectively. First and second hollow needles extend from the housing. Each of the needles includes a channel through which a different one of the T-bar ends is adapted to move. Means are provided within the housing for pushing the T-bar ends through the needles to dispense an attachment. Means are provided for severing each of the T-bar ends from the connecting bars to which it is joined, prior to being dispensed. Means are provided for advancing the assembly of attachments through the housing.

The means for pushing the T-bar ends preferably includes first and second ejector rods displaceable relative to the needles and means for simultaneously displacing the ejector rods.

The means for simultaneously displacing the ejector rods includes means mounted for movement relative to the housing between a first position where the rods are spaced from the needles and a second position where the rods are situated within the channels. This means includes depressable means and slide means operably connected to the depressable means for movement in response to the actuation of the depressable means. Both rods are operably connected to the slide means.

The advancing means include second slide means operably connected to the depressable means and movable in the response to the actuation of the depressable means. First and second gear means are located in the housing intersecting the recess. The first and second gear means are adapted to engage the assembly proximate first and second connecting bars, respectively. Means are provided for simultaneously indexing the first and second gear means in response to the movement of the second slide means.

The first and second needles are substantially oppositely oriented. The housing has first and second guide means associated with the first and second ejector rods, respectively.

To these and such other objects which may hereinafter appear, the present invention relates to an assembly of attachments and a device for attaching same as disclosed in detail on the following specification, as recited in the claims and taken together with the accompanying drawings, wherein like numerals refer to like parts and in which:

FIG. 6 is a top view of the attacher showing an attachment being anchored;

FIG. 7 is a top view similar to FIG. 6 but showing a more advanced stage in the anchoring process;

Figures 1, 9:
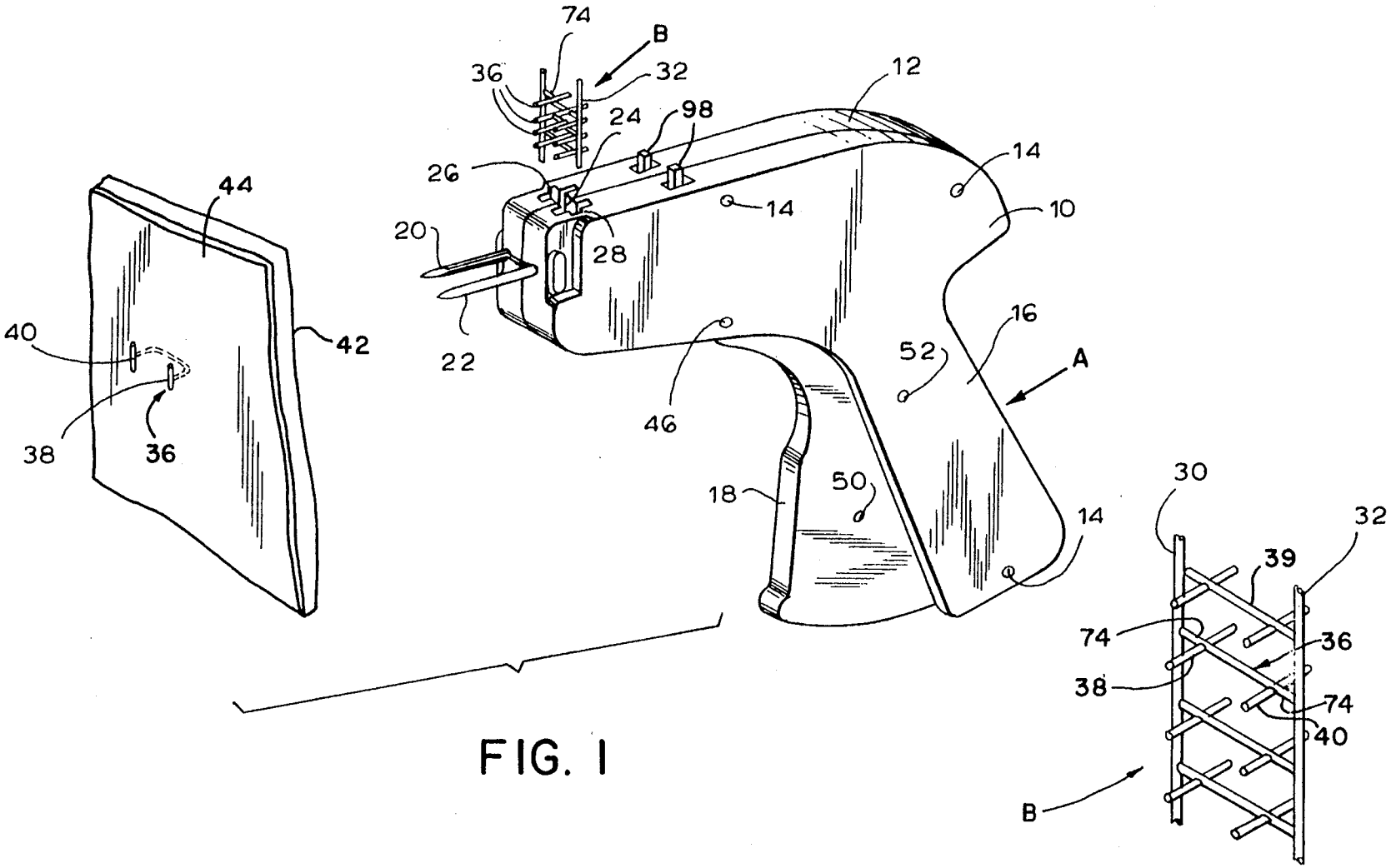
FIG. 1 is an isometric view of the attacher of the present invention showing an attachment anchored in sheets of material.
FIG. 9 is an isometric view of an assembly of attachments in accordance with the present invention.

As shown in the figures, the attacher of the present invention includes a housing generally designated A, which has two halves 10 and 12. The housing havles 10, 12 are substantially mirror images of each other and are fastened together by a series of screws 14.

Housing A is generally pistol shaped and has a handle 16 with a depressable trigger 18 extending from its forward portion. The front of housing A has a pair of oppositely oriented needles 20, 22 extending therefrom in spaced parallel relation. The forward portion of housing A is provided with a recess 24 which extends there through in a direction generally perpendicular to the plane of needles 20 and 22. Recess 24 has a generally "H" shaped configuration and includes spaced portions 26, 28 adapted to receive the connecting bars 30, 32, respectively, of the assembly of attachments, generally designated B.

As shown in FIGS. 1 and 9, each assembly B of attachments includes a plurality of attachments 36 situated in a substantially spaced, parallel relation and connected between connecting bars 30 and 32. Each of the attachments includes first and second T-bar ends 38, 40. The T-bar ends are connected by a thin stretched plastic flexible filament 39.

In order to anchor an attachment to layers of material 42, 44, such as a tag and an article of clothing, the layers are held in face-to-face relation. The attacher is manipulated such that the material and attacher are moved relative to each other until needles 20, 22 penetrate the layers. Trigger 18 is actuated causing T-bars 38 and 40 to move through hollow needles 20 and 22.

As is apparent from FIGS. 6 and 7, as the T-bar ends 38 and 40 travel down the channels in needles 20 and 22 they are substantially parallel to each other. As they release from the channels, the T-bar ends pivot back to their original orientation, parallel to the surface of the layers, as filament 39 bows. The T-bar ends thereafter lodge adjacent the rear surface of the layers, as shown in FIG. 1. The attacher and material are then moved away from each other, leaving the attachment anchored. As Trigger 18 is released, the internal indexing mechanism of the attacher advances the assembly of attachments through recess 24 in housing A such that the next attachment in the assembly aligns with needles 20 and 22.

As seen in FIGS. 2, 3, 4, 5 and 8, trigger 18 is pivotally mounted to the housing by pin 46. Trigger 18 is pivotally connected to lever 48 by pin 50 located near the lower end of lever 48 which cooperates with slot 49 in lever 48 to provide for a lost motion connection. Lever 48 is movably mounted to housing A proximate its mid section by pin 52. Lever 48 and thus trigger 18 and spring loaded towards the undepressed position shown in FIG. 2 by means of a tension spring 54 connected between lever 48 at point 56 and housing A at point 58.

The upper end of lever 48 is bifuricated with the legs 48a and 48b associated with a different one of two slides 60a, 60b. Each slide 60a, 60b is situated between a pair of guides 62 and 64 on each housing half 10, 12 for movement within housing A. Slides 60a, 60b have apertures adapted to accept the ends of ejector rods 66, 68 respectively. Each of the ejector rods 66, 68 is bent at a right angle near its rear end so as to fit into the respective apertures in slides 60a, 60b. It will be appreciated from FIG. 2 that the upper end of leg 48a of lever 48 has an elongated opening 70 therein so as to accommodate the ejector rod and its sleeve as lever 48 is pivoted about pin 52.

Figure 3:
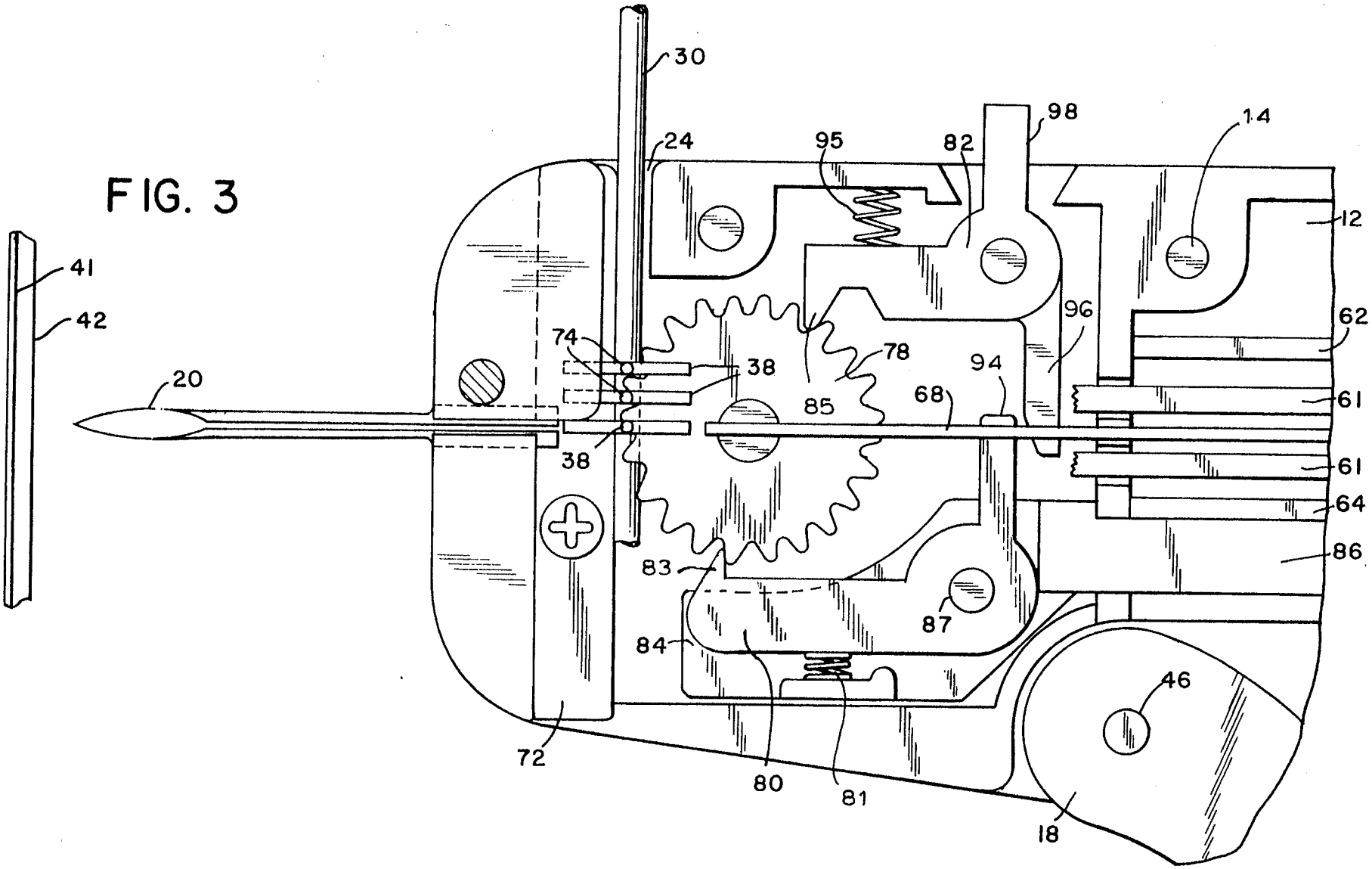
FIG. 3 is an enlarged cross-sectional view of the forward portion of the attacher of the present invention showing the indexing mechanism before actuation of the trigger.
Figure 5:
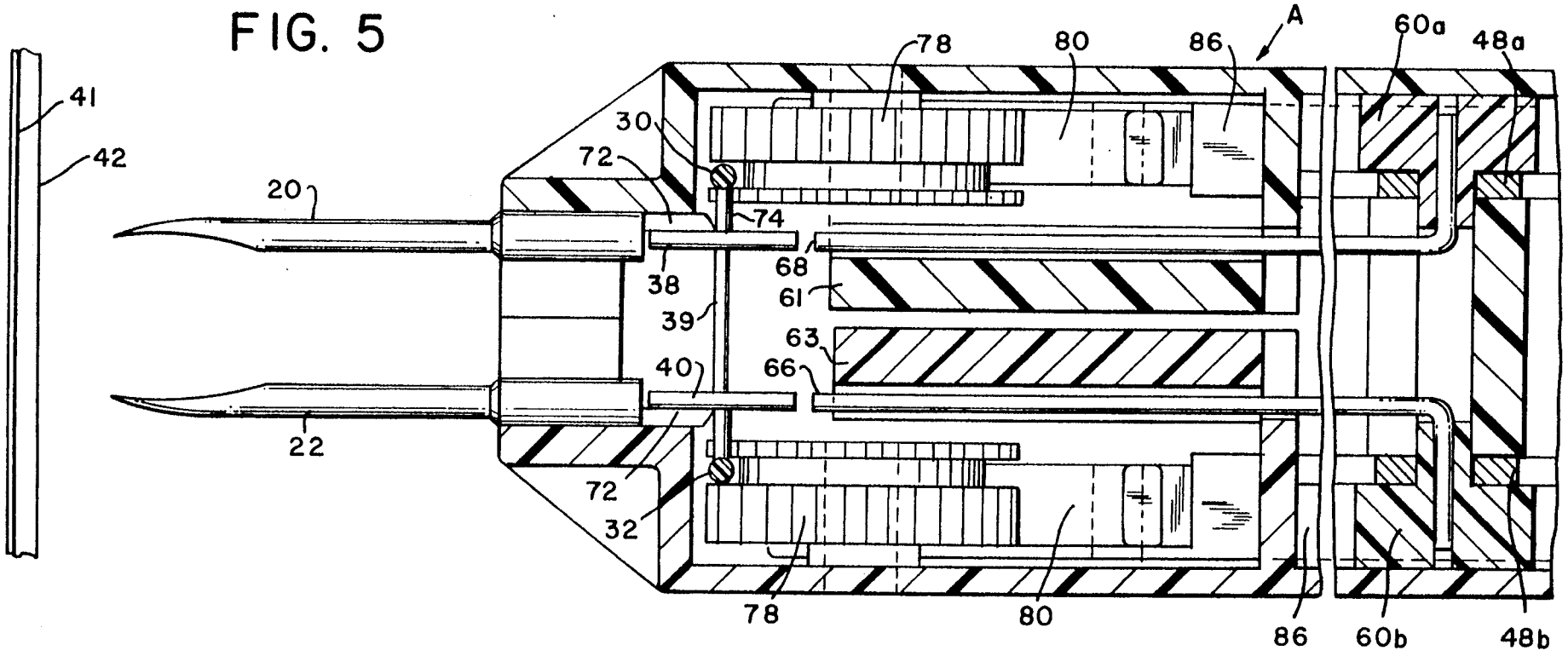
FIG. 5 is a top cross-sectional view of the portion of the attacher shown in FIG. 3.
Figure 8:
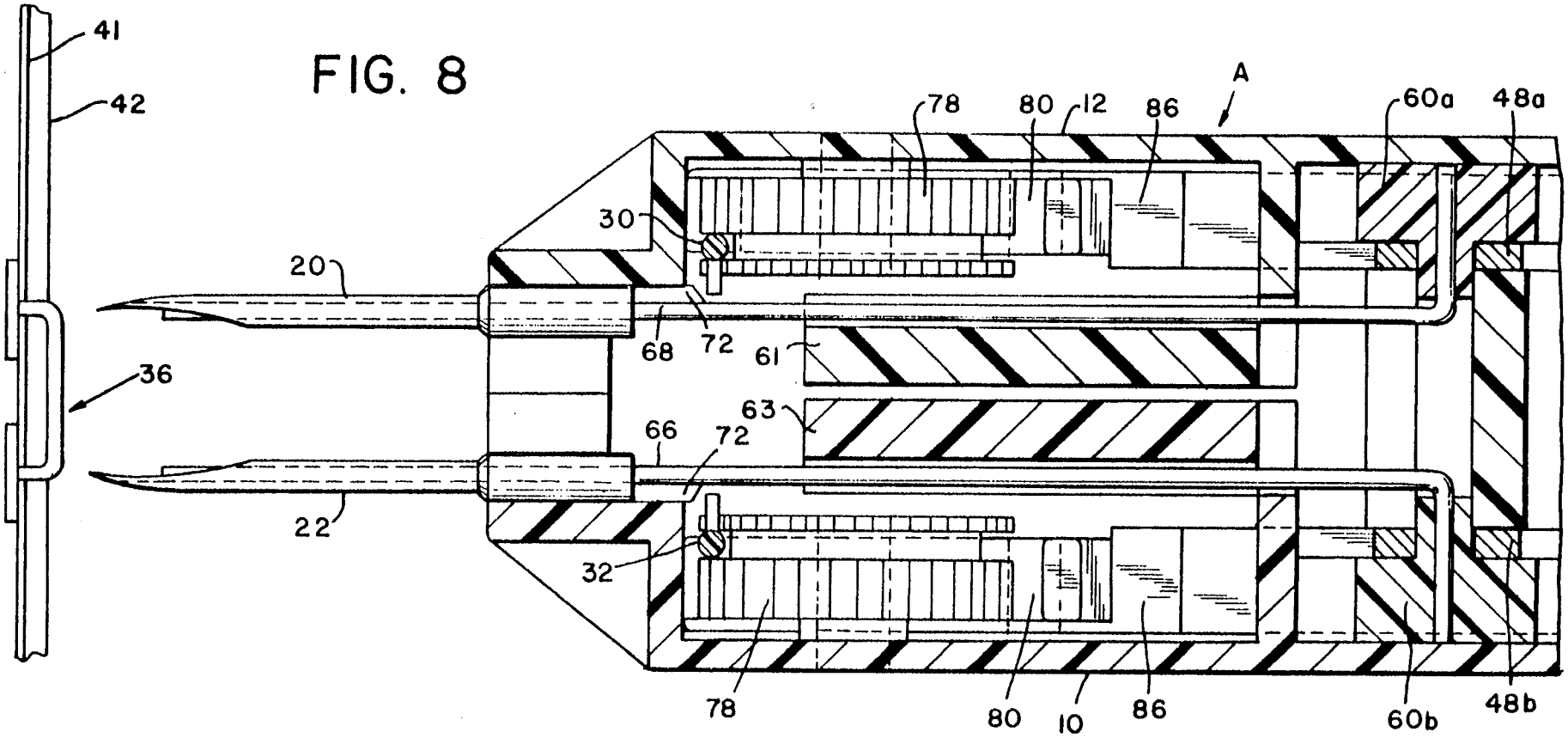
FIG. 8 is a top cross-sectional view of this portion of the attacher shown in FIG. 4.

As best seen in FIGS. 3 and 5, before trigger 18 is actuated, ejector rods 66 and 68 are situated behind needles 20 and 22, a distance sufficient to permit the T-bar ends 38, 40 of an attachment to be positioned in alignment with the channels of the respective needles 20, 22. When trigger 18 is actuated, lever 48 rotates about pin 52 and slides 60a, 60b move forward. As slides 60a, 60b move forward, ejector rods 66 and 68 are simultaneously moved toward needles 20, 22 such that the rods cause the T-bar ends 38, 40 of the attachment to move through the channels of needles 20 and 22, respectively.

Each housing half 10, 12 is provided with two ejector rod guide members 61 or 63. Members 61, 63 function to guide the movement of ejector rods 66, 68 to insure accurate movement and to eliminate jamming or bending of the rods.

Each half 10, 12 of housing A is provided with a knife blade 72 which is preferably removable from the housing so that it can be replaced when dull. The function of knife blade 72 is to sever the T-bar ends of the attachments from their respective connecting bars as the ejector rod pushes the T-bar end of the attachment through the needle.

Figure 4:
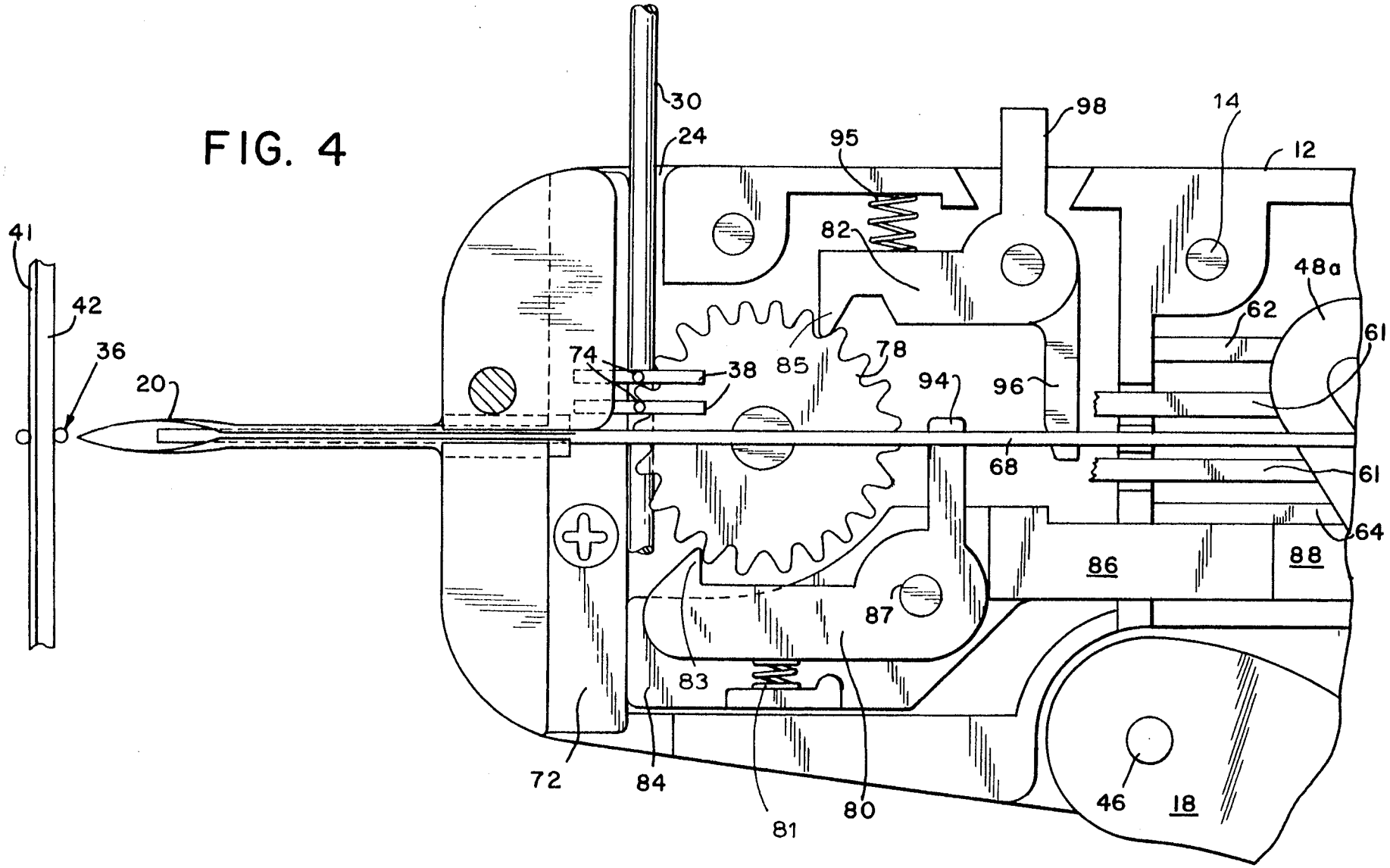
FIG. 4 is a view similar to FIG. 3 but showing the indexing mechanism after actuation of the trigger.

As best seen in FIG. 9, the T-bar ends 38, 40 of the attachments 36 are connected to and spaced from the respective connecting bars 30, 32 by bridge elements 74 which is relatively thin. Elements 74 are long enough to space the T-bar ends from the connecting bar associated therewith a distance sufficient to permit engagement of the bridge element by the gear wheels which make up the indexing mechanism. As seen in FIGS. 3 and 4, bridge elements 74 cooperate with the teeth of indexing gears 78 to advance the assembly of attachments through the housing. Two indexing gears 78 are provided, one on each side of the housing. Each cooperates with the bridge element 74 on a different side of the attachment.

Figure 2:
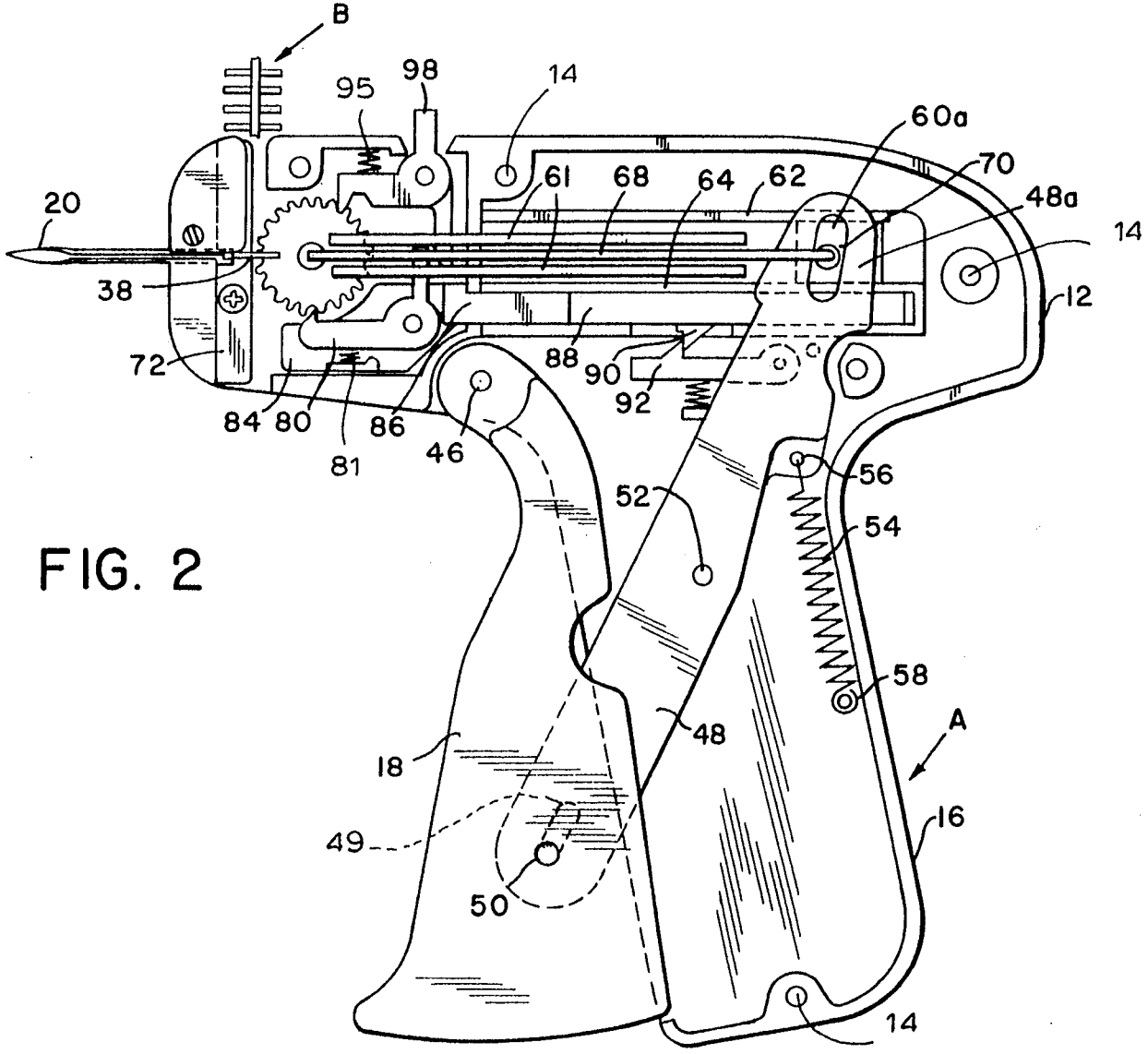
FIG. 2 is a cross-sectional view showing the internal mechanism of the attacher of the present invention.

The fastener indexing means includes first and second parallelly situated mechanisms one of which is illustrated in FIGS. 1, 2 and 3. For simplicity, the operation of only one indexing mechanism will be described, it being understood that both mechanisms are operated simultaneously by the movement of a single trigger 18.

Each indexing mechanism includes an indexing gear 78 rotatably mounted to the housing half. Gear 78 cooperates with lower and upper spring loaded pawls 80, 82 also mounted in that housing half. Each of the lower pawls 80 is pivotably mounted on a portion 84 of slide 86 by pin 87. A spring 81 urges the pawl 80 clockwise, such that tooth 83 normally engages gear 78. Slide 86 is reciprocated relative to the housing as trigger 18 is depressed, moving pawl 80 between the position shown in FIG. 3 and that shown in FIG. 4.

As best seen in FIG. 2, slide portion 86 has a recessed portion 88 into which the upper portion of one of the legs of lever 48 is received forming a lost motion connection with lever 48 such that a relatively large amount of movement of lever 48 results in a relatively small movement of slide 86 and hence slide portion 84. At the bottom of slide 86 is a downwardly projecting finger 90 which cooperates with a spring loaded lever 92 to limit the movement of the slide. As lever 48 is moved forward, lever 92 is cammed out of the way so that slide 86 and slide portion 84 can move forwardly. As slide portion 84 moves forward, finger 83 on pawl 80 is cammed over one of the teeth of gear 78, against the action of spring 81, until slide portion 86 reaches its forward most position, as shown in FIG. 4. During the forward motion of slide 86, gear 78 is held motionless by upper pawl 82 which is spring loaded towards the gear by spring 95.

As trigger 18 is released, lever 48 is rotated clockwise due to the action of spring 54, slide 86 moves rearwardly. Spring 81 urges tooth 83 of pawl 80 into engagement with the teeth of gear 78, and gear 78 rotates through an arc sufficient to bring the next attachment 36 into alignment with the needles. This occur because pawl 82 is cammed against the action of spring 95, allowing gear 78 to rotate in the counterclockwise direction.

Upper pawl 82 normally prevents movement of the gear 78 in the clockwise direction unless it is manually pivoted in a clockwise direction by depression of projection 98. Projection 98 extends above the housing such that it is manually accessible. When projection 98 is depressed, finger 85 of pawl 82 and finger 83 of pawl 80 (because extension 96 of pawl 82 contacts extension 94 of pawl 80 to rotate the latter in a clockwise direction) are no longer enmeshed in the teeth of gear 78, such that gear 78 can move freely. This permits the assembly of attachments to be removed from the housing.

The indexing mechanism and the ejector mechanism illustrated in the drawings are modified versions of typical corresponding mechanisms which have been widely used in single needle attachers. With regard to the present invention, the important aspect is that the mechanism provides for simultaneous ejection and indexing of specially configured attachments with dual T-bars 38, 40.

The present invention relates to an assembly of attachments which includes attachments with T-bars at either end. The attachments are situated in substantially parallel, spaced relation between first and second substantially parallel connecting bars.

The attacher of the present invention includes a recess having spaced sections adapted to receive the connecting bars and a pair of oppositely oriented, parallel needles extending from the front thereof. Simultaneously displaceable ejector rods serve to move the respective T-bar ends through the needles to dispense an attachment. Means are provided for indexing the assembly through the housing as each attachment is dispensed. The attachments are automatically severed from the connecting bars as they are dispensed.

While only a limited number of preferred embodiments of the present invention have been disclosed for purposes of illustration, it is obvious that many variations and modifications could be made thereto. It is intended to cover all of these variations and modifications would fall within the scope of the present invention as set forth in the following claims.

I claim:

1. An assembly of attachments comprising first and second substantially parallel connecting bars between which individual attachments are situated in substantially parallel, spaced relation, each of said attachments comprising first and second substantially cylindrical T-bar ends with a substantially flexible filament extending therebetween.

2. The assembly of claim 1 further comprising means for joining said first substantially cylindrical T-bar end to said first connecting bar and means for joining said second T-bar end to said second connecting bar.

3. The assembly of claim 1 wherein said joining means comprises bridge elements.

4. The assembly of claim 1 wherein said connecting bars are situated in a plane substantially perpendicular to planes in which said attachments are situated.

5. The assembly of claim 1 wherein said connecting bars and said attachments are integral.

6. The assembly of claim 1 wherein said attachments and said connecting bars are composed of molded plastic.

7. For use with a tagging device of the type having first and second hollow needles through which the substantially cylindrical T-bar ends of attachments are respectively dispensed, an assembly of attachments comprising first and second substantially parallel connecting bars between which individual attachments are situated in substantially parallel, spaced relation, each of said attachments comprising first and second substantially cylindrical T-bar ends with a substantially flexible filament extending therebetween and means for joining each of said T-bar ends, of each of said attachments, to a different one of said connecting bars.

* * * * *